United States Patent [19]

Neeley

[11] 4,450,543

[45] May 22, 1984

[54] SECTIONALIZED MARINE SEISMIC CABLE

[75] Inventor: Walter P. Neeley, Irving, Tex.

[73] Assignee: Mobil Oil Corporation, New York, N.Y.

[21] Appl. No.: 359,960

[22] Filed: Mar. 19, 1982

[51] Int. Cl.³ .............................................. G01V 1/38
[52] U.S. Cl. ....................................... 367/154; 367/20
[58] Field of Search ................ 367/153, 154, 160, 15, 367/20, 76, 19, 15; 174/86, 87

[56]  References Cited

U.S. PATENT DOCUMENTS

| 3,441,902 | 4/1969 | Savit | 367/20 |
| 3,459,873 | 8/1969 | Harris et al. | 174/86 |
| 3,812,455 | 5/1974 | Pearson | 367/154 |

Primary Examiner—Maynard R. Wilbur
Assistant Examiner—K. R. Kaiser
Attorney, Agent, or Firm—Alexander J. McKillop; Michael G. Gilman; George W. Hager, Jr.

[57] ABSTRACT

A marine seismic cable is sectionalized with the individual cable sections being joined by articulated connector assemblies which permit relative bending movement between such individual cable sections.

2 Claims, 4 Drawing Figures

SECTIONALIZED MARINE SEISMIC CABLE

BACKGROUND OF THE INVENTION

This invention relates to marine seismic exploration and more particularly to a sectionalized marine seismic cable employing articulated connector assemblies between individual cable sections to permit relative bending movement between such individual cable sections.

The older types of seismic cables used in the marine exploration industry were of sturdy construction and short length, on the order of a thousand feet or so. These old cables were towed behind a recording boat at a level in the water where the operators on board the boat could easily watch the cables and notice when the cables were caught on any obstructions in the water. The old cables usually included heavy stress members and rigid connections between sections of the cables so that they were relatively invulnerable to being scraped or torn. If the old cables became hung on an underwater obstruction, the tension in the cable could be felt on board the boat. The operators on the boat could easily stop the boat and disentangle the cable before damage occurred.

In recent years the exploration industry has begun to use cables of more delicate construction and relatively long length, on the order of one or two miles. Most of these new cables are designed to be streamlined in the water and are encased in a thin flexible sheath that is vulnerable to ripping or tearing when the cable is caught on an obstruction in the water. These new cables are usually filled with a fluid, such as kerosene, to make them the same density as the water so that they may ride below the surface of the water.

Sometimes these new, streamlined and delicate cables are towed by the recording boats at depths below the surface, and at other times may be weighted for laying on the ocean bottom. During deployment, recording or retrieval, these cables may become ripped or torn on underwater obstacles such as water buoys, drilling rigs, docks, fishing nets and all sorts of water bottom objects.

SUMMARY OF THE INVENTION

In accordance with the present invention, there is provided a new and improved sectionalized marine seismic cable having a plurality of individual cable sections joined together by articulated connector assemblies to permit relative bending movement between the individual cable sections.

The sectionalized marine seismic cable will be deployed from and retrieved to a storage reel located on board a seismic recording vessel. The articulated connector assemblies provide for a minimum bend radius to the cable no greater than the radius of the storage reel so that the cable may be deployed and retrieved with minimal bending stress.

The articulated connector assembly permits pivotal movement of each seismic cable section in two degress of freedom about such connector assembly. Each of the two degrees of freedom of pivotal movement operating independently provides angular movement between the adjoining cable sections and each of the two degrees of freedom of pivotal movement operating together provides relative rotational movement between the adjoining cable sections.

DESCRIPTION OF THE PREFERRED EMBODIMENT

Figure 1:
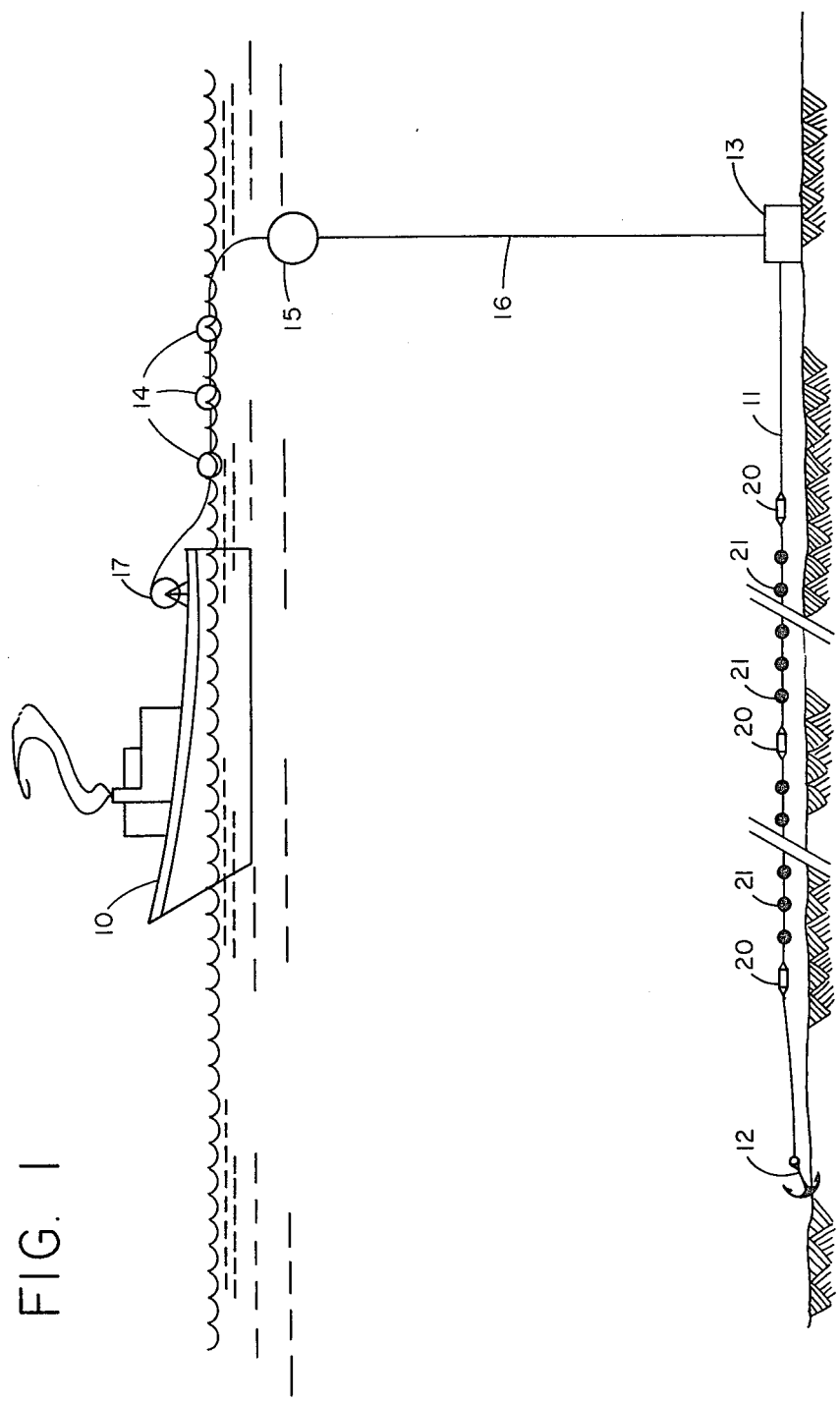
FIG. 1 illustrates a marine seismic exploration operation employing the sectionalized marine cable of the present invention.

Referring now to FIG. 1, there is shown a seismic recording boat 10 which deploys and retrieves a marine seismic recording cable 11. For purposes of illustration, the cable 11 is illustrated as being deployed and anchored on the ocean bottom by means of the drag anchor 12 and clump anchor 13. The cable is supported at the water surface by means of the surface floats 14 and a subsurface buoy 15 located at the top of the riser section 16 of the cable.

The cable itself comprises a plurality of hydrophones 21 for detecting seismic reflection or refraction signals during recording operations.

The cable 11 is stored on the reel 17 located near the stern of the recording boat. To permit the cable to be deployed and retrieved without being damaged from twisting and flexing in the water and from bending to conform to the shape of the reel 17, there is provided a sectionalized cable which is articulated to provide a two degree freedom of rotation and at the same time provide a bend radius sufficient to permit the cable to be uniformly wound about the reel. Suitable tension devices may also be provided for the laying of the cable on the ocean floor.

Figure 2:
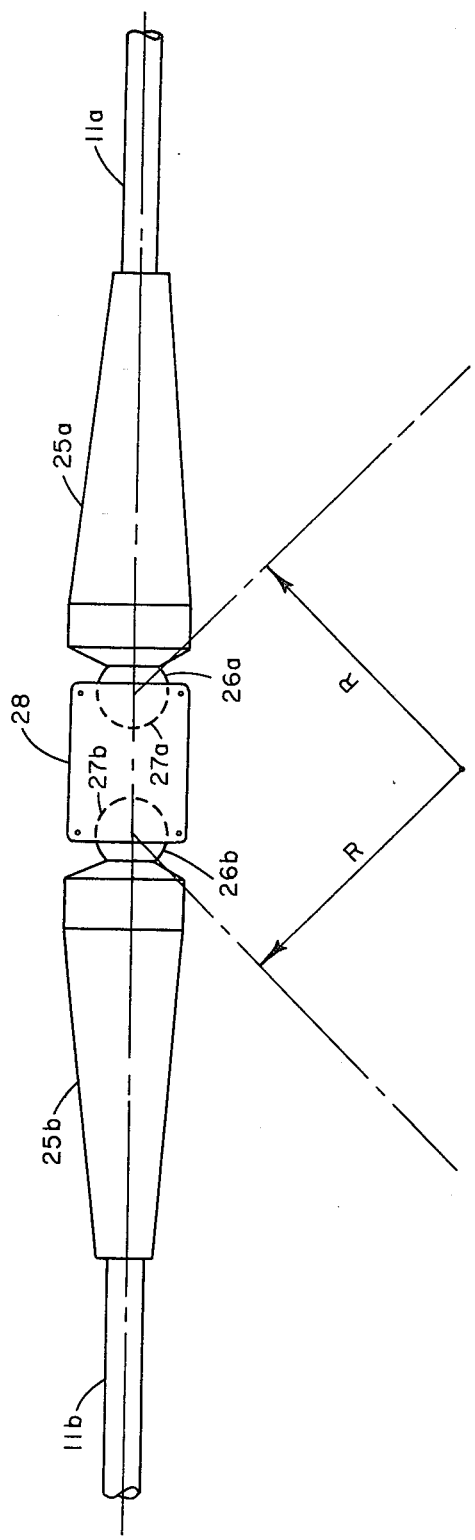
FIG. 2 illustrates an articulated connector assembly for use with the sectionalized marine cable of FIG. 1.

Referring now to FIG. 2, the articulated marine seismic cable of the present invention is illustrated in more detail. Each section of the cable 11, such as a and b, terminates in a strain relief member such as 25a and 25b. An inner strength load transmitting core of each section of the cable is affixed internally of the strain relief members 25a and 25b. The ends of the strain relief members 25a and 25b are in the form of spherical or ball-like protrusions 26a and 26b configured to fit into a mating socket 27a and 27b within a connector 28. The signal carrying electrical conductors of each section of the cable pass through the strain relief members 25a and 25b and connect together within the connector 28 to complete the electrical continuity between the cable sections 11a and 11b.

Figure 3:
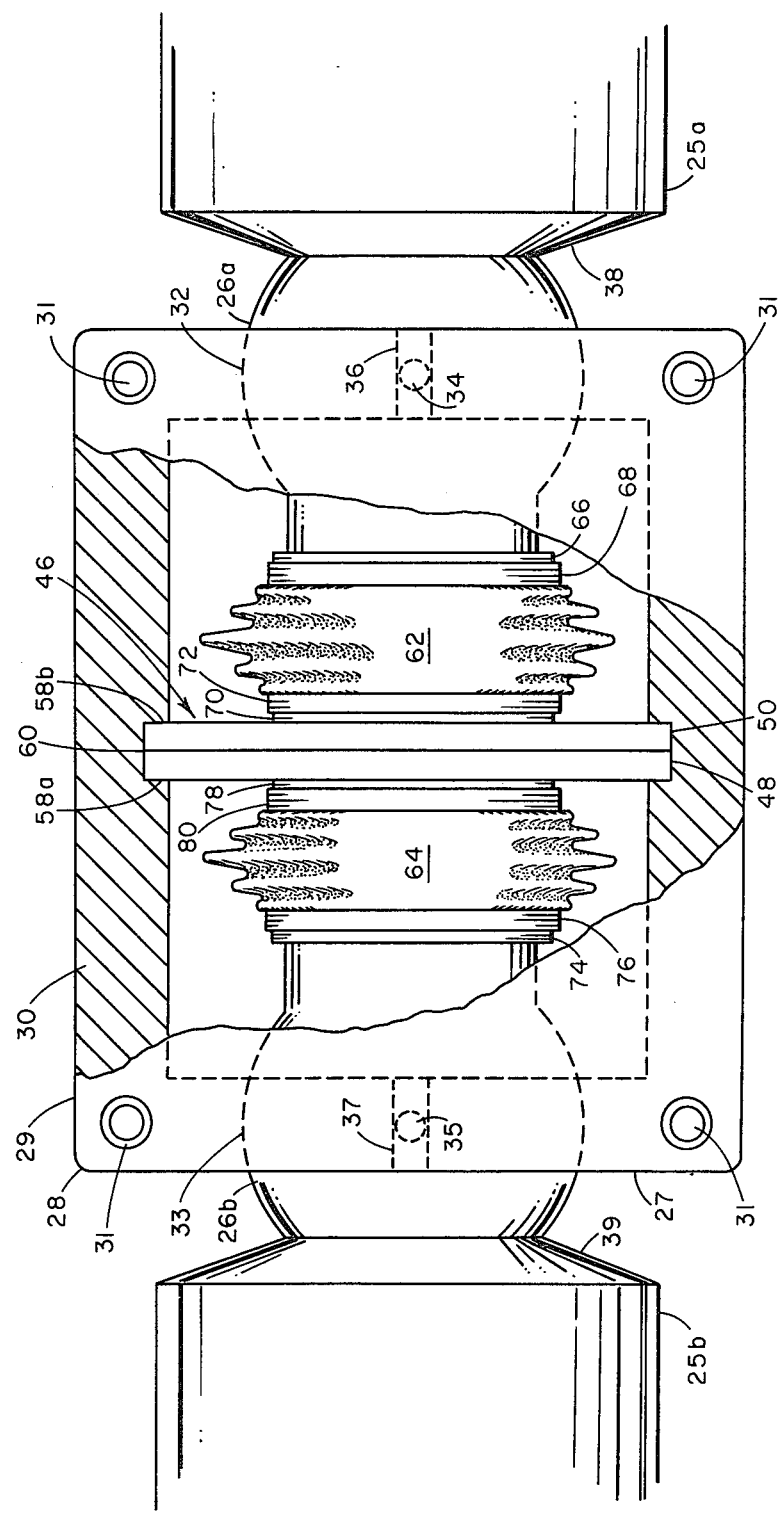
FIGS. 3 and 4 are partial sectional views of the articulated connector assembly of FIG. 2.
Figure 4:
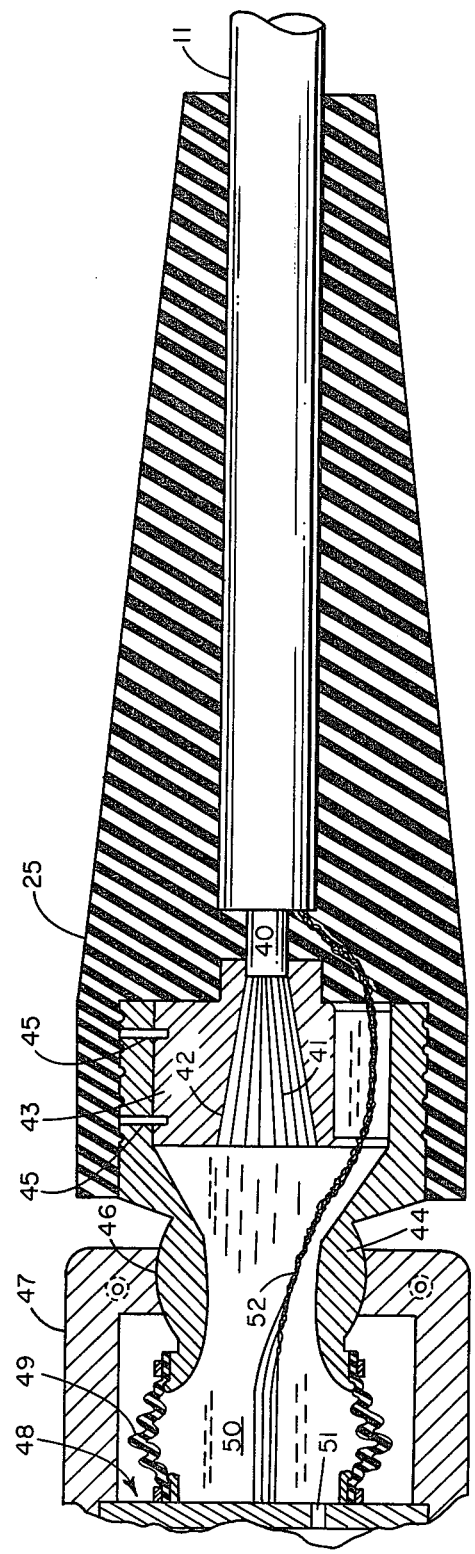

Referring now to FIGS. 3 and 4, there is shown one embodiment for the articulating connector assembly of FIG. 2 which has been built and successfully tested. The connector 28 comprises a hollow, cylindrical housing formed in two parts, 29 and 30, and bolted or otherwise secured together at 31. The ends of the connector provide a socket 32 and 33 for supporting the spherical or ball-like members 26a and 26b of the stain relief members 25a and 25b, respectively, in a ball and socket type joint. The ball-like members 26a and 26b are maintained with the sockets 32 and 33, respectively, by means of two pairs of pivot pins 34 and 35 and two pairs of pin grooves 36 and 37. One pair of pivot pins 34 are seated within recesses on opposite sides of the outer surface of the ball-like member 26a, while a second pair of pivot pins are seated within recesses on opposite sides of the outer surface of the ball-like member 26b. The portion of the pair of pivot pins 34 extended out of the surface of ball-like member 26 are inserted into a pair of pin grooves 36 formed within opposite sides of the surface of socket 32 of the connector 28. In like manner, the pair of pivot pins 35 are inserted into pin grooves 37 within socket 33 of the connector 28. In accordance with this particular configuration for the articulated connector assembly, pivotal movement of marine cables 11a and 11b about the connector 28 is permitted by way of rotation of the pairs of pins 34 and 35 in the grooves 36 and 37 respectively in a first degree of freedom and by way of translation of pins 34 and 35 in the grooves 36 and 37 respectively in a second degree of freedom. Each of these two degrees of freedom of pivotal movement of the marine cables 11a and 11b about the connector 28 permits relative angular movement of marine cables 11a and 11b with respect to each other, while both such freedoms of pivotal movement operating together permit relative angular and rotational movement of marine cables 11a and 11b with respect to each other. The amount of angular movement is limited by contact of the surfaces 38 and 39 of strain relief members 25a and 25b, respectively, with connector 28.

It is an important feature of the present invention that the amount of rotational and angular movement of the articulate connector assembly permit sufficient bend of the sectionalized cable 11 such that its minimum bend radius is no greater than the radius of the storage reel 17 onto which the cable is to be wound for storage on the recording boat 10. This will allow the sectionalized cable to be deployed from and retrieved to the storage reel without damage to the connector assembly due to its being wound about such storage reel.

Referring now to FIG. 4, the articulated connector assembly is shown in even greater detail. Each end of the sectionalized marine seismic cable 11 terminates within a strain relief member 25. The load transmitting core 40 flares out into strands 41 within the tapered orifice 42 of a swedge block 43. The strands 41 are secured to swedge block 43 by epoxy resin or other suitable restraining means. Swedge block 43 is supported within the termination member 44 by means of dowel pins 45. Terminate member includes a hollow spherical or ball-like protrusion that is seated into the socket 46 of connector 47. Concentrically supported within the connector 47 is the electrical connector 48. The electrical conductors 49 within the cable 11 pass through the swedge block 43 and termination member 44 and are connected at the electrical connector 48 with the electrical conductors of the next succeeding section of cable 11. Enclosing the electrical conductors 52 between the termination member 44 and the electrical connector 48 is the flexible bellows 49. This bellows is constructed from a suitable flexible tough material which is impervious to sea water, for example, polyurethane.

Filling the chamber 50 internally of the bellows 49, the termination member 44 and swedge block 43, is a suitable incompressible pressure equalizing dielectric liquid, such as kerosene, which provides transfer of sea water pressure to such chamber. The liquid enters the chamber by way of removable filler plug 51 in the electrical connector 48.

The foregoing has described the articulated marine seismic cable of the present invention. It is to be understood that various modifications to the disclosed embodiment, as well as alternate embodiments, may become apparent to one skilled in the art without departing from the scope and spirit of the invention as hereinafter defined by the appended claims.

I claim:
1. A marine seismic cable comprising:
 a. a plurality of marine seismic cable sections,
 b. a plurality of articulated connector assemblies joining said cable sections to form a sectionalized marine seismic cable, each articulated connector assembly comprising:
   i. a housing having first and second sockets provided in opposite ends thereof;
   ii. a pair of diametrically opposed grooves in the inner surface of each of said first and second sockets and extending longitudinally relative to said housing;
   iii. a first strain member to which one end of a first seismic cable section is affixed and having a ball-like member at one end thereof;
   iv. a second strain member to which one end of a second seismic cable section is affixed and having a ball-like member at one end thereof; and
   v. a pair of pins extending from opposite sides of said ball-like members of said first and second strain members and extending into the grooves in the first and second sockets of said housing, whereby two degrees of freedom of movement of said first and second cable sections relative to one another is permitted during seismic exploration operations, a first degree of said movement being effected by rotational movement of said pins within said grooves and a second degree of said movement being effected by translational movement of said pins along said grooves.

2. The marine seismic cable of claim 1 wherein:
(a) the ball-like menbers of said first and second strain members includes a passageway for the electrical conductors of said first and second seismic cable sections into said housing, and
(b) said housing includes an electrical connector for connecting the electrical conductors of said first and second seismic cable sections.

* * * * *